United States Patent [19]

Hatz et al.

[11] 4,386,589
[45] Jun. 7, 1983

[54] INTERNAL COMBUSTION ENGINE

[75] Inventors: Ernst Hatz; Erich Absenger, both of Ruhstorf; Johann Schmuck, Bad Feilnbach, all of Fed. Rep. of Germany

[73] Assignee: Motorenfabrik Hatz GmbH & Co. KG, Ruhstorf, Fed. Rep. of Germany

[21] Appl. No.: 263,325

[22] Filed: May 13, 1981

[30] Foreign Application Priority Data

Jan. 23, 1981 [DE] Fed. Rep. of Germany ....... 3102154

[51] Int. Cl.³ .................................................. F02B 75/06
[52] U.S. Cl. .................................... 123/192 B; 74/604
[58] Field of Search .................... 123/192 R, 192 B; 74/573 R, 603, 604

[56] References Cited

U.S. PATENT DOCUMENTS

| | | | |
|---|---|---|---|
| 3,402,707 | 9/1968 | Heron | 123/192 B |
| 3,415,237 | 12/1968 | Harkness | 123/192 B |
| 3,759,238 | 9/1973 | Irgens | 123/192 B |

FOREIGN PATENT DOCUMENTS 844071  8/1960  United Kingdom ............ 123/192 B

*Primary Examiner*—William A. Cuchlinski, Jr.
*Attorney, Agent, or Firm*—Flynn, Thiel, Boutell & Tanis

[57] ABSTRACT

A single cylinder internal combustion engine has a piston which drives a crankshaft and flywheel through a connecting rod and has a counterweight arrangement which balances forces produced by the moving engine elements. The counterweight arrangement includes a weight on the crankshaft and two weights on the flywheel which fully balance the forces produced by rotating motion of the engine parts and partially balance the forces produced by reciprocal motion of the engine parts. Two balance shafts are provided which are parallel to and driven synchronously with the crankshaft. The balance shafts have respective first weights thereon which complete the balance of forces produced by the reciprocating motion of engine parts and have respective second weights thereon which balance the moment of the first weights with respect to the axis of the cylinder.

11 Claims, 9 Drawing Figures

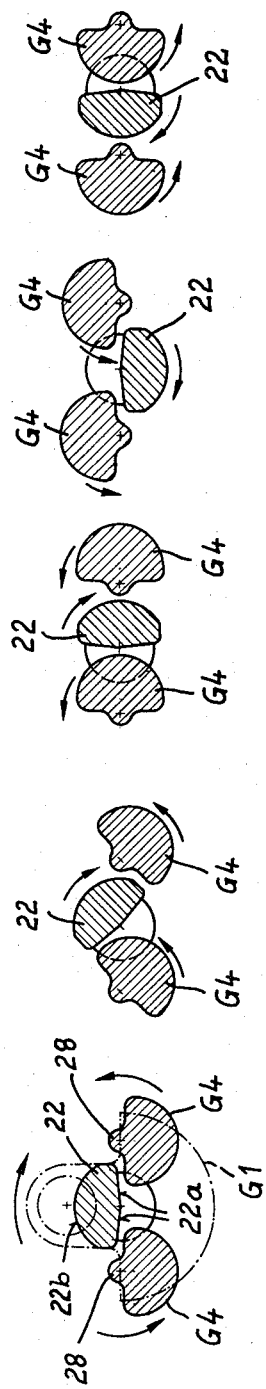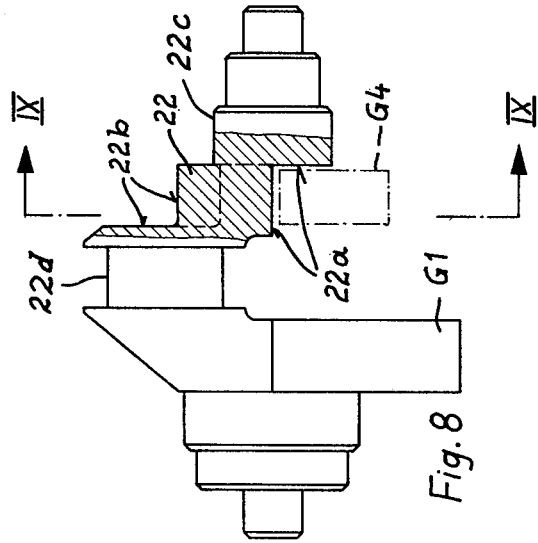

INTERNAL COMBUSTION ENGINE

FIELD OF THE INVENTION

This invention relates to a single cylinder internal combustion engine having a crankshaft, a connecting rod and a piston, and having a counterweight arrangement for balancing the centrifugal forces resulting from rotating engine elements and free mass forces of the first order resulting from reciprocating engine elements.

BACKGROUND OF THE INVENTION

Conventional internal combustion engines of the foregoing type have, in addition to the counterweights which are secured on the crankshaft, additional balancing weights which are driven by the crankshaft and rotate oppositely to one another in order to achieve a balance of the reciprocating free mass forces. Such balancing weights are generally arranged below or laterally of the crankshaft in order to keep their path of movement outside of the paths of movement of the crankshaft and the connecting rod.

The arrangement of the balancing weights below the crankshaft requires a lower placement of the crankcase so that the balancing weights do not dip into the lubricating oil provided there. This arrangement is disadvantageous, due to the resulting size increase of the engine. Also, the drive chain which drives the balancing weights is complicated by the lower placement.

The arrangement of the balancing weights laterally of the crankshaft leads automatically to a considerable broadening of the crankcase and thus is also disadvantageous because of the resulting increase in engine size.

Arrangements have also been suggested which use balancing weights which rotate around the crankshaft connecting-rod bearing pin. Such balancing arrangements are, however, particularly complicated in their structure and furthermore require a considerable extension of the crankshaft or its connecting-rod bearing pin in an axial direction, which again is very disadvantageous.

SUMMARY OF THE INVENTION

A purpose of the present invention is to overcome the described disadvantages of the conventional arrangements and to provide a balancing arrangement which assures a complete elimination of the generally known and undesired effects from free mass forces of the first order and also permits a compact size of the arrangement by using a minimum of structural elements. This purpose is attained inventively by providing balancing weights which are directly or indirectly connected to the crankshaft and have, in addition to the out-of-balance mass required for balancing the rotating centrifugal forces, half of the out-of-balance mass needed to balance the reciprocating free mass forces of the first order, and also by providing two balance shafts which are driven by the crankshaft and are parallel to it, which balance shafts rotate in the same direction with respect to one another but in a direction opposite to the crankshaft, each of the shafts carrying a further balancing weight which produces one-fourth of the out-of-balance force which is necessary to balance the reciprocating free mass forces of the first order.

An axially compact crankshaft and thus also a design of the internal combustion engine which is compact in spite of the balancing weights is achieved according to a further characteristic of the invention by having the balancing weights provided on each balance shaft cooperate with recesses provided in the crankshaft so that, during rotary movement of the crankshaft, the recesses alternately pass the balancing weights on the two balance shafts. The recesses are preferably arranged on the crankshaft in an advantageous manner between a crankshaft main bearing and the crankshaft connecting-rod bearing.

In this arrangement, a full balance of free mass forces of the first order is achieved. In order to also be able to balance moments from such forces, the size and location of the balancing weights which are positioned directly or indirectly on the crankshaft and their distance from the cylinder axis must be selected so that their resulting moment is zero in relationship to the cylinder axis.

With respect to the necessary balancing of the moments from mass forces on the two balance shafts, each balancing weight thereon which cooperates with the recesses of the crankshaft is predetermined in its size, and an additional balancing weight is arranged on each balance shaft at a location spaced from the crankshaft elbow so that it acts on the balance shaft against the balancing weight and thereby brings the moment which results from such balancing weight in relationship to the cylinder axis to zero.

In considering the construction of the inventively designed balancing arrangement, one should particularly pay attention to the fact that, due to the arrangement of the out-of-balance masses on the crankshaft, its dimensions and its weight need not increase excessively. Thus, in the case of a development which is advantageous in this respect, the arrangement for engines which are equipped with a flywheel driven by the crankshaft is such that the out-of-balance mass connected to the crankshaft and necessary for the balancing consists of a balancing weight which is directly connected to the crankshaft and of at least one further balancing weight which is arranged on the flywheel connected to the crankshaft. It is thereby possible to make the out-of-balance mass of the balancing weight connected directly to the crankshaft particularly small, if the residual out-of-balance mass needed for a full balance is provided by increasing the further balancing weight provided on the flywheel. Since one can easily form the out-of-balance mass on the flywheel with one or more bores therein a compact flywheel design is maintained.

According to a further characteristic of the invention, the out-of-balance mass of the balancing weight provided on the flywheel consists of a larger weight and a smaller weight, which weights are dimensioned, together with the balancing weight on the crankshaft and with respect to size, location and distance from the cylinder axis, so that the aforementioned full force and moment balance is assured.

A further goal of the invention is to design the gearing for driving the balance shafts with the smallest number of structural elements. For this purpose, a drive gear is mounted on the crankshaft and cooperates directly with mating gears provided on each of the balance shafts.

A further simplification in the gearing design is achieved if a mating gear which drives the valve control shaft also cooperates with the drive gear on the crankshaft.

BRIEF DESCRIPTION OF THE DRAWINGS

One exemplary embodiment of the subject matter of the invention is discussed in connection with the drawings, in which:

FIGS. 3-7 are sectional views of portions of the engine of FIG. 1 illustrating several relative positions of the crankshaft with respect to balance weights provided on balance shafts;

FIG. 8 is a side view, partially in cross section, of the crankshaft of the engine of FIG. 1 in an enlarged scale; and FIG. 9 is a sectional view taken along the line IX—IX of FIG. 8.

DETAILED DESCRIPTION

Figure 1:
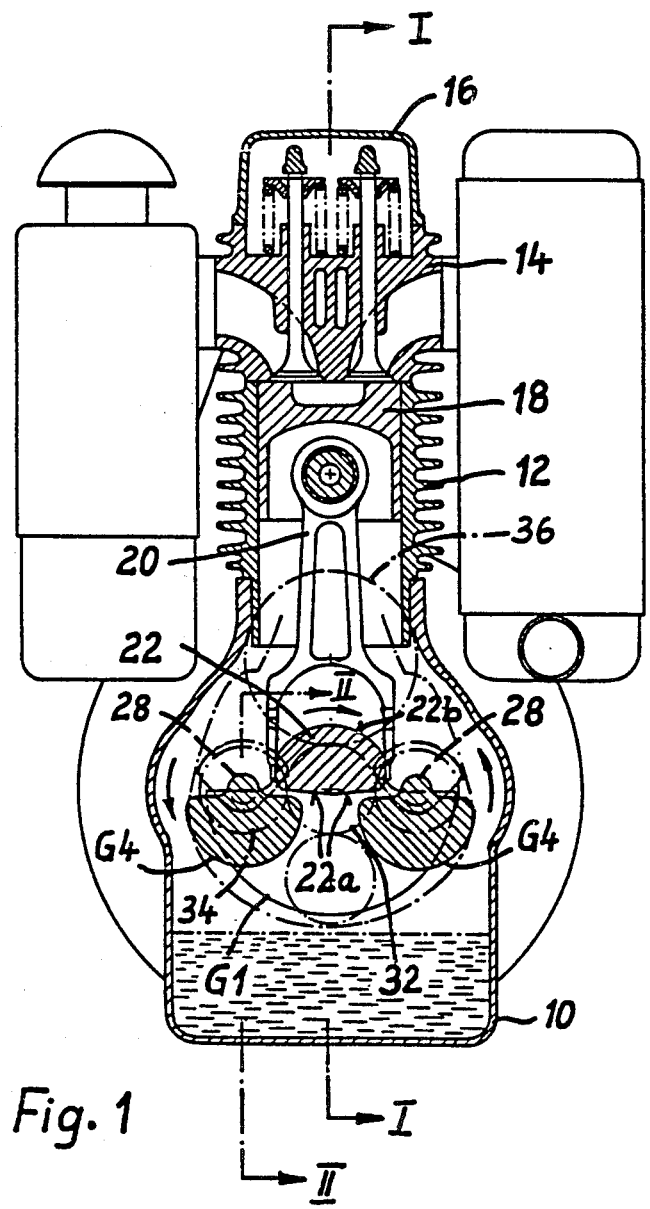
FIG. 1 is a cross-sectional view of an internal combustion engine embodying the present invention.

A single cylinder, air-cooled, internal combustion engine is illustrated in the drawings. It includes a crankcase 10 (FIG. 1), a cylinder 12, a cylinder head 14 and a cylinder head lid 16. These elements are fixedly interconnected with the help of screws (not illustrated). A piston 18 which moves back and forth in the cylinder 12 is coupled in a conventional manner by a connecting rod 20 to a crankshaft 22 (FIG. 2) which is rotatably supported within the crankcase 10.

A flywheel 24 (FIG. 2) is secured on the crankshaft 22 and, in the present case, is designed as a cooling fan which moves cooling air through a guide channel 26 toward the cylinder 12 and the cylinder head 14. The front side of the flywheel 24, which side does not face the engine, can be utilized in a conventional manner to drive aggregates.

It is known that, during the operation of a piston stroke internal combustion engine, free mass forces occur on the crankshaft assembly which must be countered by a balancing arrangement in order that they not act as free forces or moments on the machine base and create undesired vibrations or shocks. Part of the mass forces are the centrifugal forces of rotating engine elements (like the crankshaft web, the crankpin and the rotating part of the connecting rod) and the mass forces of reciprocating engine elements (like the piston and the reciprocating part of the connecting rod).

The centrifugal force from the rotating elements occurs as a constant, rotating, and always outwardly acting centrifugal force Frot, the magnitude of which in newtons is defined by the formula $$Frot = m_{rot} \cdot \omega^2 \cdot r,$$

where $m_{rot}$ is the mass of the rotating elements, $\omega$ is the angular velocity, and r is the radius of rotation of the crankshaft crank.

The mass force of the reciprocating elements is a force which always acts along the cylinder axis and is periodically variable. Its maximum first order magnitude in newtons is defined by the formula $$Fosz = m_{osz} \cdot \omega^2 \cdot r,$$

where $m_{osz}$ is the mass of the reciprocating elements, $\omega$ is the angular velocity, and r is the radius of rotation of the crankshaft crank.

Figure 2:
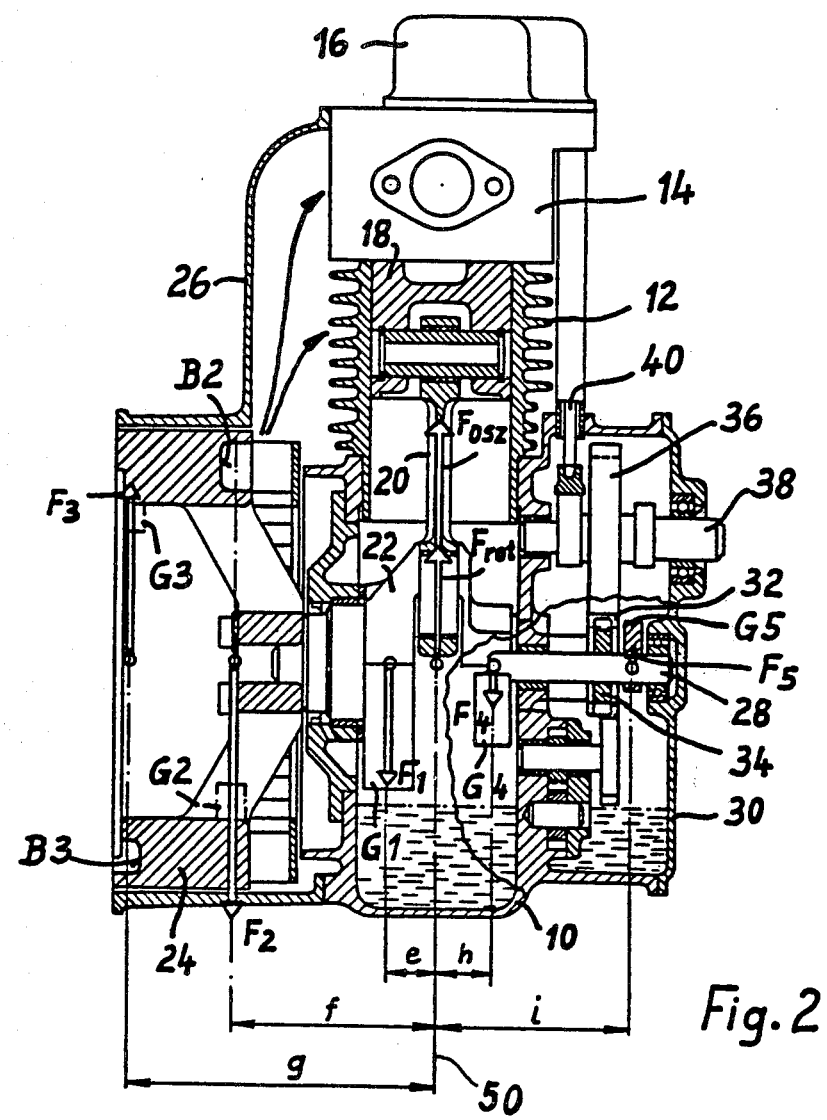
FIG. 2 is a sectional view taken along the line I—I and partially along the line II—II of FIG. 1.

According to FIGS. 1 and 2, the piston 18 is in the top dead center position, and the upwardly acting mass forces are shown in FIG. 2 as two vectors Frot and Fosz which are directed along the cylinder axis. If a complete balance of the undesirable effects of the free mass forces of the first order is to be achieved, then with the help of a balancing arrangement an opposite force of the same magnitude must be produced. Also, free moments, particularly about a horizontal axis, must not thereby be produced.

The inventively designed balancing arrangement includes therefore a weight G1 (FIG. 2) which is mounted on the left portion of the crankshaft in FIGS. 2 and 8, the mass force of which is indicated by a vector F1 in FIG. 2. Two further weights G2 and G3 (FIG. 2) are mounted on the flywheel 24, the mass forces of which are indicated by vectors F2 and F3. Although the balancing weights G2 and G3 are shown functionally as weights in the drawings using dash-dotted lines, in reality they consist of respective bores B2 and B3 which are provided on diametrically opposite areas of the flywheel 24.

The balancing arrangement is such that the balancing weights G1, G2 and G3 are each directly or indirectly connected to the crankshaft 22 and produce, in addition to the out-of-balance mass necessary to balance the rotating forces Frot, half of the out-of-balance mass ($\frac{1}{2}$ Fosz) which is necessary for balancing the reciprocating forces Fosz. The other half of the force Fosz is countered with the help of a further balancing arrangement described hereinafter. Accordingly, it must be assured that $$\tfrac{1}{2}Fosz + Frot = F1 + F2 - F3$$

or, in other words, that $$\tfrac{1}{2}Fosz + Frot - F1 - F2 + F3 = 0.$$

In addition, it must be assured that $$(\tfrac{1}{2}Fosz + Frot) \cdot 0 = (F1 \cdot e) + (F2 \cdot f) - (F3 \cdot g) = 0,$$

where e, f and g are designated in FIG. 2 and represent lever arms or rather the respective distances of the weights G1, G2 and G3 from the cylinder axis.

As mentioned above, the second half of the force Fosz is countered by means of a further balancing arrangement, which arrangement includes two identical balance shafts 28, each of which is rotationally supported in the crankcase 10 and a bearing lid 30 so as to be parallel to and an equal distance from the crankshaft 22. In the case of the illustrated engine, the shaft 22 and the shafts 28 all lie in a common plane.

A drive gear 32 mounted on the crankshaft 22 engages a mating gear 34 on each balance shaft 28 and thereby drives the two shafts 28 in the same rotational direction with respect to each other, but in an opposite rotational direction with respect to the crankshaft 22. The drive gear 32 on the crankshaft 22 engages yet a further mating gear 36 which is provided on a rotatable control shaft 38 having a cam which drives the rods 40 which operate the rocking levers controlling the valves.

A balancing weight G4 is mounted on each balance shaft 28 so as to project into the crankshaft rotation area between the right main bearing portion 22c (FIG. 8) and the connecting-rod bearing portion 22d of the crankshaft 22. To make this possible, an inner recess 22a (FIGS. 8 and 9) and an outer recess 22b are provided on the right side of the crankshaft 22 in FIG. 8. During rotation of the crankshaft 22, these recesses 22a and 22b alternately pass both balancing weights G4. In this manner, it is possible for the synchronous rotary movement of the weights G4 and the crankshaft 22 to take place without interference, as can be recognized from the various relative operating positions of these elements illustrated in FIGS. 3-7.

Each balance shaft 28 also has, at the end adjacent the lid 30, an additional smaller balancing weight G5 which acts against the larger weight G4 on the balance shaft 28 and balances its moment.

The balance of the second half of Fosz is assured, both with respect to the mass forces and also moments, when the following equations are satisfied:

$$\tfrac{1}{2}Fosz = 2(F4 - F5)$$

or, in other words, $$\tfrac{1}{2}Fosz + 2F5 - 2F4 = 0,$$

and $$(\tfrac{1}{2}Fosz)\cdot 0 = 2(F4\cdot h - F5\cdot i) = 0.$$

Here also, h and i are designated in FIG. 2 and represent lever arms or rather the respective distances of the weights G4 and G5 from the cylinder axis.

As best shown in FIG. 2, the weights G1, G2 and G3 all lie on one side of a plane 50 which is perpendicular to the axis of rotation of the crankshaft 22 and contains the connecting rod 20 and the axis of the cylinder 20. The weights G4 and G5 lie on the opposite side of the plane 50.

In the case of the described arrangement of the balancing weights G1, G2, G3, G4 and G5 satisfying the above calculation, one achieves a balancing arrangement which permits a compact design of the crankshaft and consequently a spacially compact construction of the engine, yet assures a full balancing of free mass forces of the first order and their moments.

It is further mentioned that, in the case of an internal combustion engine in which the free mass forces and the moments need not be fully balanced, the two balance shafts 28 with weights G4 and G5 can simply be left out while maintaining the remaining structural elements in the described configuration. Thus, a basic engine is obtained with the crankshaft 22 with weight G1, flywheel 24 with weights G2 and G3, and crankcase 10 and bearing lid 30 having bearing bores for the shafts 28. This basic engine is not fully balanced but can, if necessary, be completely balanced by simply adding the two balance shafts 28 with weights G4 and G5 into the already existing bearing bores. This arrangement results in substantial manufacturing and technical simplification and thus in particularly economical manufacture of the engine.

In conclusion, it is to be pointed out that in certain cases of operation the two additional balancing weights G5 can be left out because the two balancing weights G4 are positioned so close the cylinder axis that the moment which remains after omission of the weights G5 is very small and in practice can be disregarded.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A single cylinder internal combustion engine, comprising rotatably supported crankshaft means, a piston, a connecting rod operatively connecting said piston and crankshaft means and counterweight means for balancing centrifugal forces produced by rotating masses and free mass forces of the first order produced by reciprocating masses of the engine, said counterweight means including means defining a balancing mass on said crankshaft means which has the out-of-balance mass needed to balance said centrifugal forces and the out-of-balance mass needed to balance a portion of said free mass forces of the first order, and including two rotatably supported balance shafts which are parallel to and rotationally driven by said crankshaft means in the same direction with respect to one another and in a direction opposite the direction of rotation of said crankshaft means, each said balance shaft having thereon a first balancing weight which has half of the out-of-balance mass needed to balance the remainder of said free mass forces of the first order, said means defining a balancing mass on said crankshaft means being located on one side of a plane which is perpendicular to said crankshaft means and contains said connecting rod, and said first balancing weights on said balancing shafts being located on the other side of said plane.

2. The internal combustion engine according to claim 1, wherein said first balancing weight provided on each said balance shaft cooperates with recesses provided in said crankshaft means so that, during rotary movement of said crankshaft means, said recesses alternately pass each said first balancing weight of said balance shafts.

3. The internal combustion engine according to claim 2, wherein said recesses are arranged between a main bearing and a connecting rod bearing of said crankshaft means.

4. The internal combustion engine according to claim 2, wherein on each said balance shaft there is provided a second balancing weight which counterbalances the moment of said first balancing weight in relationship to the axis of said engine cylinder.

5. The internal combustion engine according to claim 1, wherein said crankshaft means includes a flywheel and a crankshaft, said means defining a balancing mass on said crankshaft means including means defining a second balancing weight on said crankshaft and means defining a third balancing weight on said flywheel.

6. The internal combustion engine according to claim 5, wherein the out-of-balance mass of said second balancing weight is substantially smaller than the out-of-balance mass of said third balancing weight.

7. The internal combustion engine according to claim 6, including means defining a fourth balancing weight on said flywheel which counterbalances moments of said second and third balancing weights in relationship to the axis of said engine cylinder.

8. The internal combustion engine according to claim 1, wherein said crankshaft means includes a drive gear which cooperates with gears provided on each of said balance shafts to effect said rotation of said balance shafts.

9. The internal combustion engine according to claim 8, including a further gear which is provided on a control shaft which controls valves of said engine and operatively engages said drive gear of said crankshaft means.

10. The internal combustion engine according to claim 1, wherein said balancing mass on said crankshaft means has the out-of-balance mass needed to balance half of said free mass forces of the first order and said first balancing weights on said balance shafts each have the out-of-balance mass needed to balance one-fourth of said free mass forces of the first order.

11. The internal combustion engine according to claim 1, wherein the axes of said crankshaft and balance shafts are substantially coplanar.

* * * * *